(12) United States Patent
Bradstreet et al.

(10) Patent No.: US 10,923,825 B2
(45) Date of Patent: Feb. 16, 2021

(54) SPIRAL ANTENNA SYSTEM

(71) Applicant: SRC, Inc., North Syracuse, NY (US)

(72) Inventors: Lance M. Bradstreet, Liverpool, NY (US); Christopher J. Thornton, Clay, NY (US); Russell W. Striffler, Marietta, NY (US)

(73) Assignee: SRC, Inc., North Syracuse, NY (US)

( * ) Notice: Subject to any disclaimer, the term of this patent is extended or adjusted under 35 U.S.C. 154(b) by 889 days.

(21) Appl. No.: 15/647,855

(22) Filed: Jul. 12, 2017

(65) Prior Publication Data
US 2019/0020104 A1 Jan. 17, 2019

(51) Int. Cl.
| | | |
|---|---|---|
| *H01Q 9/27* | (2006.01) | |
| *H01Q 1/38* | (2006.01) | |
| *H01Q 11/08* | (2006.01) | |
| *H01Q 1/36* | (2006.01) | |
| *H01Q 21/20* | (2006.01) | |
| *G01S 3/14* | (2006.01) | |
| *H01Q 3/01* | (2006.01) | |
| *H01Q 3/26* | (2006.01) | |

(52) U.S. Cl.
CPC .............. *H01Q 9/27* (2013.01); *G01S 3/14* (2013.01); *H01Q 1/362* (2013.01); *H01Q 1/38* (2013.01); *H01Q 3/01* (2013.01); *H01Q 3/26* (2013.01); *H01Q 11/083* (2013.01); *H01Q 21/205* (2013.01)

(58) Field of Classification Search
CPC ......... H01Q 1/362; H01Q 9/27; H01Q 11/083
See application file for complete search history.

(56) References Cited

U.S. PATENT DOCUMENTS

| | | | |
|---|---|---|---|
| 4,658,262 A | 4/1987 | Duhamel | |
| 8,922,452 B1 | 12/2014 | O'Brien et al. | |
| 2005/0243013 A1* | 11/2005 | Neel | H01Q 1/38 343/895 |
| 2007/0171074 A1* | 7/2007 | Camp | G08B 13/2417 340/572.7 |
| 2011/0133986 A1* | 6/2011 | Bellion | H01Q 9/27 342/362 |
| 2014/0300526 A1* | 10/2014 | Rahman | H01Q 1/36 343/867 |

OTHER PUBLICATIONS

Vinayagamoorthy, Kalyany et al. "Microstrip to Parallel Strip Balun as Spiral Antenna Feed". IEEE May 2012 pp. 1-5. Yokohama, Japan.

(Continued)

*Primary Examiner* — Graham P Smith
*Assistant Examiner* — Amal Patel
(74) *Attorney, Agent, or Firm* — Bond Schoeneck & King, PLLC; George McGuire (57) ABSTRACT

A spiral antenna, comprising a first arm and a second arm. The first arm and second arm are interlaced with each other. Each arm has a plurality of turns comprising an inner subset of circular turns, and an outer subset of turns, electrically coupled to the inner subset, having a shape with only four lines of symmetry. An array of such spiral antennas disposed a substrate that extends in a direction of a longitudinal axis and having a round cross section in a plan transverse to the longitudinal axis.

18 Claims, 10 Drawing Sheets

(56) References Cited

OTHER PUBLICATIONS

"DF Antenna Subsystem Rev F". Nov. 16, 2008. R.A. Wood Associates, Utica, New York. http://www.rawood.com/eng_consulting_ex/DF_Antenna_Assembly/DF_Antenna_Assembly_sm_pdf.
"ESDF-118 Electronically Scanned Direction Finding System". Innovative Antenna Solutions, pp. 1-2. Thousand Oaks, California. Accessed by Jan. 27, 2017. http://www.tecom-ind.com/files/1/536bc8c0a0290-WebAD1011005.pdf.
Baheti, A. et al., 'Analysis of Multi Turn 4-Arm Archimedean Spiral Antenna with Varying Spacing between Arms', PIERS Proceedings, Kuala Lumpur, Malaysia, pp. 1554-1558, Mar. 27-30, 2012.

* cited by examiner

SPIRAL ANTENNA SYSTEM

FIELD

Antenna system, and in particular a spiral antenna system having turns of differing shapes.

BACKGROUND

Spiral antennas are known to receive or transmit signals over a relatively broad range of electromagnetic frequencies. They have numerous applications ranging, for example, from communications, direction finding, and sensing.

A spiral antenna radiates beams of electromagnetic radiation, one normal to each face of the spiral. One face radiates (or transmits) with a right-hand circular polarization and the other face radiates (or transmits) with a left-hand circular polarization. The polarization type is determined by the direction of the spiral windings.

It is understood that, for a spiral antenna, the radially innermost turns (i.e., the smallest turns) receive or transmit the highest frequency radiation, and the radially outermost turns (i.e., the largest turns) receive or transmit the lowest frequency radiation.

Several configurations of spiral antennas are known. The most common configuration of spiral antenna is known as an Archimedean which includes two, interlaced circularly spiraling antenna arms. Each arm is formed by a trace (i.e., a continuous segment of conductive material). The radial position of an arm varies linearly proportionally to the cumulative rotational position relative to a center point. The Archimedean shape is defined by Equation 1 where A is the proportionality constant defining the linear proportion between radial position of an arm and radial position.

$$r = A\phi \qquad \text{Equation 1}$$

Typically, an arm of an Archimedean spiral has a trace width that is equal to the distance between adjacent trace widths. In order to meet this condition the proportionality constant, A, is specified as shown in Equation 2.

$$A = \frac{2 TraceWidth}{\pi} \qquad \text{Equation 2}$$

A second configuration of spiral antenna is known as an equiangular antenna (also referred to as a log periodic spiral antenna). Like the Archimedean, the equiangular antenna includes two, curved, interlaced spiral arms; however, the antenna's radial arm position grows exponentially as a function of rotational position as shown in Equation 3 where $R_{inner}$ is the inner radius, $\phi$ is the rotational position, and b is the growth rate.

$$r = R_{inner} e^{b\phi} \qquad \text{Equation 3}$$

Another configuration of a spiral antenna is known as the square (or rectangular) spiral antenna which is similar to Archimedean antennas except that the interlaced arms form square or rectangular shapes rather than curved shapes.

Other designs exist such as a meandering Archimedean design or a meandering equiangular design where a periodic bend is introduced along the entire length of each arm of an antenna. For example, the bend may be sinusoidal having a frequency such that there are multiple periods present in each turn of a spiral.

Each of the above configurations has advantages and disadvantages in a given application. For example, for antennas operating over a given frequency band of radiation, a square spiral is known to use a given about of area more efficiently than an Archimedean spiral. However, parameters such as polarization purity, beam shape, and impedance performance of square antennas are typically not as good as the Archimedean or the log periodic designs, in particular when uniformity of the parameters across a band of frequencies is desirable.

Figure 1:
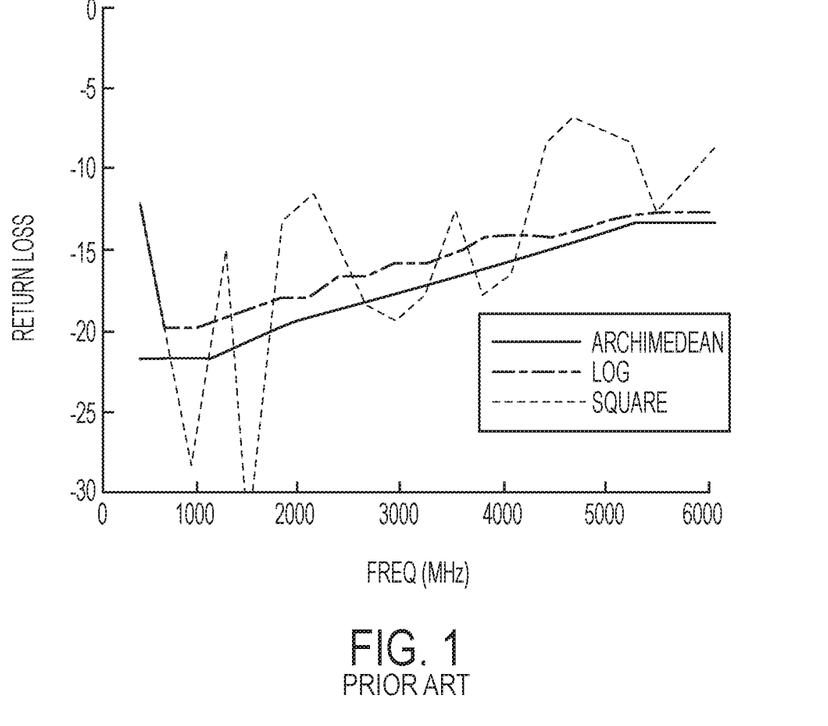
FIG. 1 is a graphical representation of the return loss for each of an Archimedean antenna, a log periodic antenna, and a square antenna.

Return loss is a representative example of an antenna characteristic that varies as a function of frequency. Return loss varies as a function of frequency due to impedance mismatching as a result of the input impedance varying as a function of frequency. FIG. 1 is a graphical representation of the return loss for each of an Archimedean antenna, a log periodic antenna, and a square antenna. Each antenna was designed to have lowest frequency of operation of 400 MHz. It can readily be seen that the square antenna's return loss performance varies to a greater degree than the remaining antennas.

SUMMARY

The inventors have determined that a spiral antenna having a shape comprising a plurality of turns, where the radially innermost turns (i.e., the smallest turns, corresponding to the high frequency emissions) are substantially circular, and the radially outermost turns (i.e., the largest turns, corresponding to the low frequency emissions) have a squarish-circular shape.

An advantage of spiral antennas according to some aspects of the invention is that they achieve more efficient use of a given area than an Archimedean antenna, and they provide better polarization purity, on-axis beam shape, and more uniform impedance across a given band of frequencies than a square spiral antenna.

To facilitate mathematical description of a hybrid of an Archimedean antenna and a square antenna, a general definition of a circle and a square, shown in Equation 1, is employed.

$$x^n + y^n = r^n \qquad \text{Equation 4}$$

Figure 2:
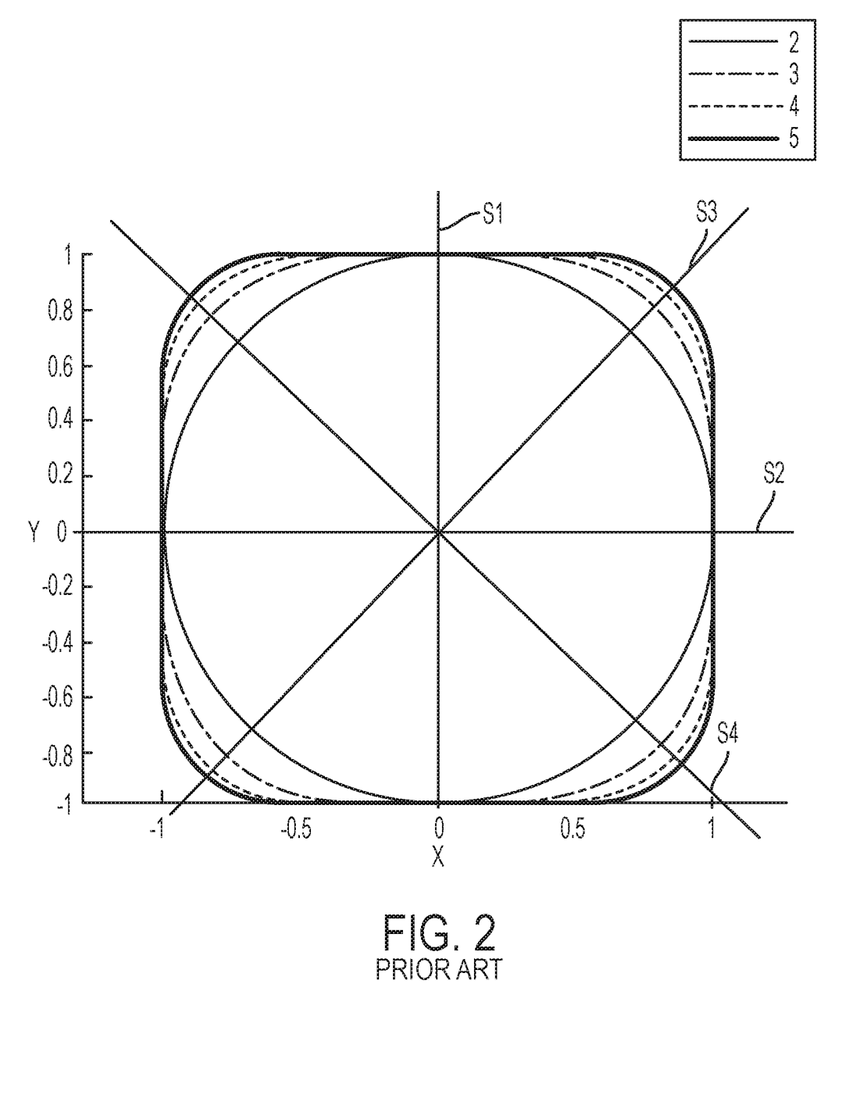
FIG. 2 is a graphical illustration of shapes defined by Equation 4 for selected values of n.

It is well known that, in Equation 1, if n=2, a circle of radius r is defined; and if n=∞, a square having a side of length 2r is defined. FIG. 2 illustrates the shapes defined by Equation 1 for selected values of n. It will be appreciated that shapes corresponding to n>2.25 have only four lines of symmetry $S_1$-$S_4$ (similar to a square) and a circle (n=2) has an infinite number of lines of symmetry. As defined herein the term "squarish circle" (also referred to as a "squircle") is used to refer to a shape defined by equation 1, where 2.25<n<5.

Equation 1 can alternatively be expressed in polar coordinates as shown in Equations 5.

$$x = r|\cos\phi|^{\frac{2}{n}} \text{sgn}(\cos\phi)$$
$$y = r|\sin\phi|^{\frac{2}{n}} \text{sgn}(\sin\phi) \qquad \text{Equation 5}$$

where sgn(sin $\phi$) equals +1 when the sign of sin $\phi$ is positive and equals −1 when the sign of sin $\phi$ is negative, and sgn(cos $\phi$) equals +1 when the sign of cos $\phi$ is positive and equals −1 when the sign of cos $\phi$ is negative.

In accordance with one aspect of the present invention, there is provided a spiral antenna, comprising a first arm and a second arm. The first arm and second arm are interlaced with each other. Each arm has a plurality of turns. The plurality of turns comprises an inner subset of circular turns, and an outer subset of turns, electrically coupled to the inner subset, having a shape with only four lines of symmetry.

In some embodiments, the first arm and second arm are identical with the first arm rotated 180-degrees relative to the second arm. In some embodiments, the antenna has a first curved face. The antenna may be formed on a substrate.

In some embodiments, the first arm continuously changes from the circular shape of the inner turns to the shape having only four lines of symmetry.

The first arm and the second arm may be defined by the equations:

$$x = r(\phi)|\cos\phi|^{\frac{2}{n(\phi)}}\text{sgn}(\cos\phi) \quad \text{Equation 6}$$
$$y = r(\phi)|\sin\phi|^{\frac{2}{n(\phi)}}\text{sgn}(\sin\phi)$$

The inner subset of turns may have values of n in the range 1.9≤n≤2.1 and a value of A in the range 0.95 to 1. In some embodiments, the inner subset of turns has values of A in the range 0.99 to 1. In some embodiments, the inner subset of turns has values of n equal to 2.

In some embodiments, the outer subset of turns has values of n where 4≥n≥2.5. The outer subset of turns may have values of A in the range 0.95≥A≥0.9.

In some embodiments, at least one of first arm and the second has a trace width that varies as a function of cumulative radial position.

In some embodiments, the antenna comprises a conductive border surrounding the outermost turn of the first arm and the second arm. The antenna may further comprise a gap between the outermost turn of the first arm and the second arm and the border, such that the first arm and the second arm are electrically separated from the border. In some embodiments, the border extends radially at least 1 mm from the gap at all circumferential locations around the first arm and the second arm.

In accordance with another aspect of the invention, there is provided an array of spiral antennas, comprising a substrate extending in a direction of a longitudinal axis and having a round cross section in a plan transverse to the longitudinal axis. Four spiral antennas are disposed on the substrate at different circumferential locations around the substrate. Each spiral antenna comprises a first arm and a second arm. The first arm and the second arm are interlaced with each other. Each arm comprises a plurality of turns, the plurality of turns comprising an inner, subset of circular turns, and an outer subset of turns having a shape with only four lines of symmetry.

In some embodiments, the first arm and the second arm of each antenna are defined by the equations:

$$x = r(\phi)|\cos\phi|^{\frac{2}{n(\phi)}}\text{sgn}(\cos\phi) \quad \text{Equation 7}$$
$$y = r(\phi)|\sin\phi|^{\frac{2}{n(\phi)}}\text{sgn}(\sin\phi)$$

In some embodiments, the antenna array comprises a conductive border surrounding the outermost turn of the first arm and the second arm of each antenna.

In some embodiments, the array further comprises a gap between the outermost turn of the first arm and the second arm of each antenna and the border, such that the first arm and the second arm of each antenna is electrically separated from the border.

In some embodiments, the border extends at least 5 mm from each of the gaps at all circumferential locations around the first arm and the second arm of each antenna.

These and other aspects of the present invention will become apparent upon a review of the following detailed description and the claims appended thereto.

The term "turn" as used herein refers to a continuous portion of a trace of spiral antenna that covers 360 degrees of position about a center point.

DETAILED DESCRIPTION

The invention will be further described with reference to the following specific examples. It is understood that these examples are given by way of illustration and are not meant to limit the disclosure or the claims to follow.

Figure 3A:
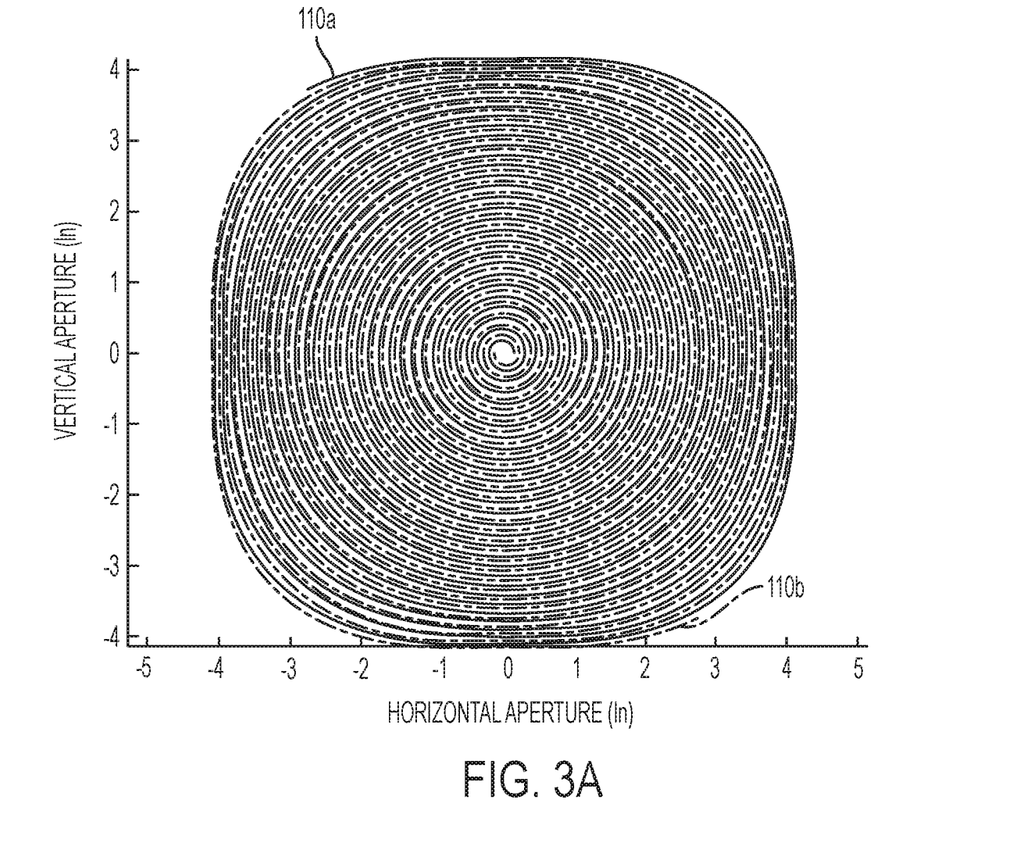
FIG. 3A is an illustration of a spiral antenna according to aspects of the present invention including a first arm and a second arm each having circular inner turns and squarish circular outer turns.

FIG. 3A is schematic illustration of a spiral antenna 100 according to aspects of the present invention. Antenna includes a first arm 110a and a second arm 110b, interlaced with each other in a conventional manner. In the illustrated embodiment, arms 110a and 110b are identical, but with one arm rotated 180-degrees relative to the other arm. Although the illustrated embodiment has two arms, more than two arms may be used. Any suitable manner of interlacing arms may be used.

Figure 3B:
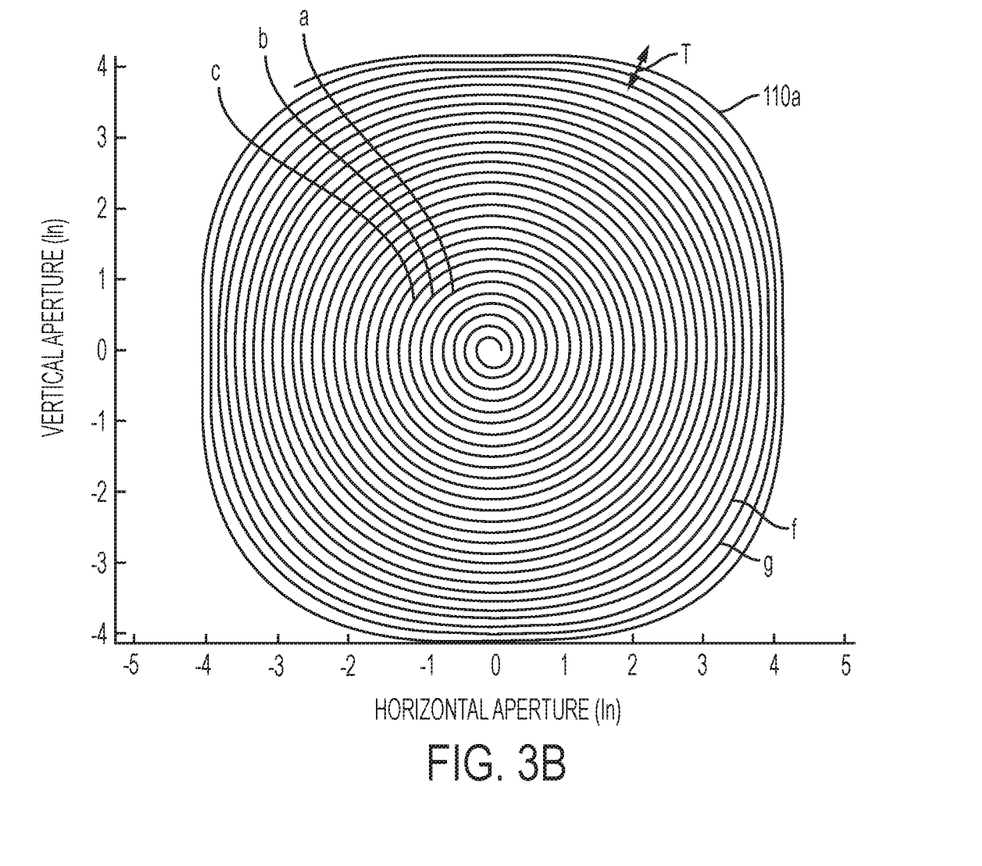
FIG. 3B is a graphical representation of the first arm of the antenna of FIG. 3A, in accordance with an embodiment.
Figure 3C:
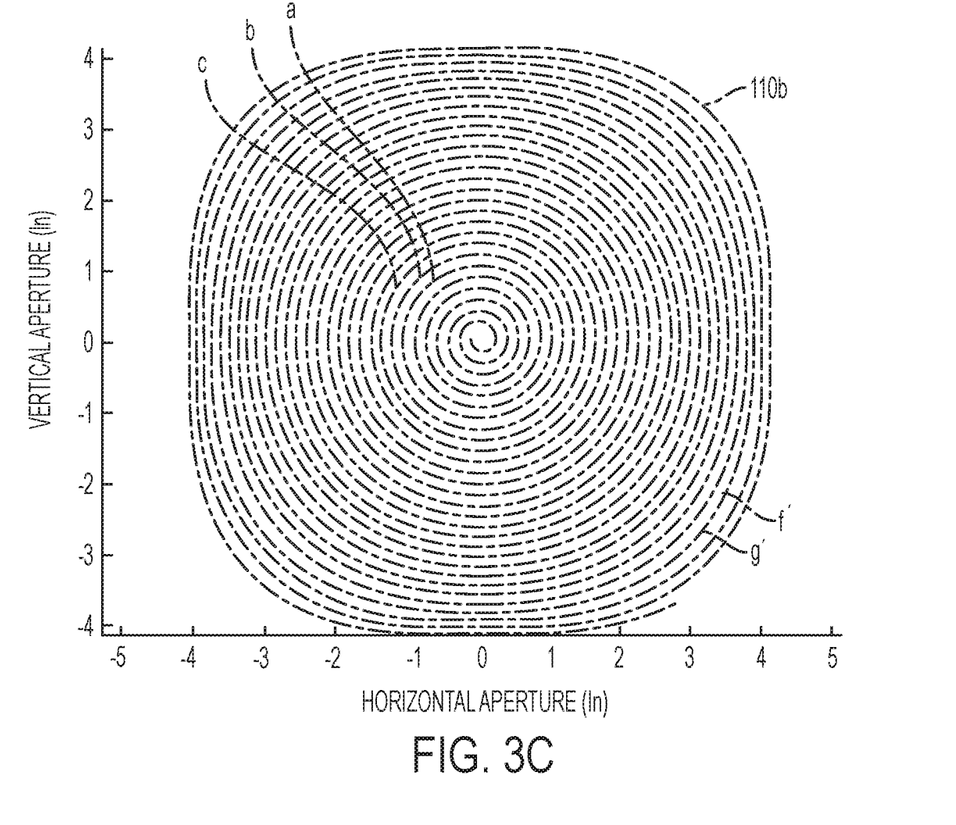
FIG. 3C is a graphical representation of the second arm of the antenna of FIG. 3A, in accordance with an embodiment.
Figure 8A:
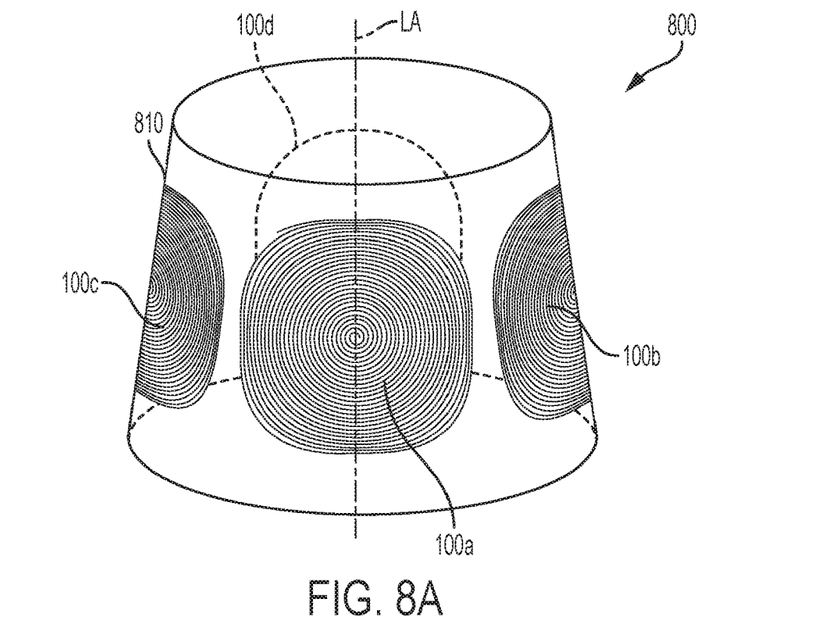
FIG. 8A is a projection view of an example of an antenna array according to an embodiment.

As illustrated in FIGS. 2B and 2C, each arm 110a, 110b comprises a plurality of turns. The plurality of turns includes an inner subset of turns a-c that are substantially circular, and an outer subset of turns f-g having a shape with only four lines of symmetry. As described herein, between the inner subset and the outer subset there may exist a region comprising a subset of turns that transitions from a circular shape to a shape having only four lines of symmetry. Spiral antenna 100 may have planar or curved faces. (An example of an antenna having curved faces is illustrated in FIG. 8A below.) Spiral antenna 100 may be formed on a substrate or be free standing.

It will be appreciated that it is advantageous (e.g., for modeling and manufacture) to have a mathematical expression for such a spiral antenna where the shape of the turns of the antenna changes from a circular shape to squarish circle. To that end, equation 1 is modified as shown in Equation 6 to allow the rate of change of the radial position to vary as a function of cumulative rotation position as defined by $A(\phi)$. Such a modification results in a radial position that is a function of cumulative radial position expressed as:

$$r(\phi) = A(\phi)\phi \quad \text{Equation 8}$$

where proportionality constant $A(\phi)$ is a monotonically increasing function of radial position $\phi$.

As indicated above with reference to Equations 5, circles and squares and shapes therebetween can be described in a polar coordinate form. Equation 5 takes the following form when the radial position r and exponent n are modified such that radial position and the exponent can vary as a function of cumulative rotation position $$x = r(\phi)|\cos\phi|^{\frac{2}{n(\phi)}} \mathrm{sgn}(\cos\phi) \quad \text{Equation 9}$$
$$y = r(\phi)|\sin\phi|^{\frac{2}{n(\phi)}} \mathrm{sgn}(\sin\phi)$$

where exponent $n(\phi)$ is a monotonically increasing function of radial position $\phi$.

It will be appreciated that by allowing exponent n to vary as a function of cumulative rotation position from a value of 2 (i.e., a value specifying a circular spiral shape) to a value greater than 2 an increasingly squarish-circular shape is attained. Accordingly, the shape changes from a circularly symmetric shape to a shape having only four lines of symmetry.

In some embodiments of spiral antennas the trace width $T(\phi)$ is allowed to vary along the length of an arm of an antenna. In some instances, spiral antennas are designed such that the surface area of the conductive arm equals area of the surface that is absent of conductive material to achieve a condition known as Babinet condition, in which case the impedance of a spiral antenna Z can be expressed as follows:

$$Z^2 = \frac{\eta^2}{4} \quad \text{Equation 10}$$

where $\eta$ is the impedance of free space.

Accordingly, when Babinet's condition is met, assuming a free space impedance of 377 ohms, the impedance of the antenna is 188.5 ohms. It will be appreciated that, for an antenna having a complex shape, the impedance as well as other parameters, such as beam shape, will typically vary as a function of frequency.

A characteristic of a spiral antenna is bandwidth. The bandwidth of the spiral is determined by the radius of the inner spiral and the radius of the outer spiral as specified by Equation 8 and Equations 9. The radiating region for a particular wavelength of electromagnetic radiation is disposed approximately where the circumference of a turn is equal to that particular wavelength. It will be appreciated that such a correspondence is approximate. An approximate lower frequency, $f_{lower}$, and an approximate upper frequency, $f_{upper}$, are given by Equations 11 and 12 which also specify, an approximate bandwidth of an antenna.

$$f_{lower} = \frac{c}{2\pi R_{outer}} \quad \text{Equation 11}$$

$$f_{upper} = \frac{c}{2\pi R_{inner}} \quad \text{Equation 12}$$

It will be appreciated that parameters $A(\phi)$, $T(\phi)$ and $n(\phi)$ (described above) may be selected to achieve a particular radiative performance (e.g., beam shape and impedance across a frequency band). Typically, the goal for the impedance is to keep the reactive part of the impedance at or near zero across the frequency band and to have a constant resistance across the frequency band. It will be appreciated that an advantage of such a design that it facilitates matching the input impedance across the entire bandwidth to that of an input (e.g, an input signal provided by a coaxial cable). Antennas according to aspects of the present invention may or may not be so designed.

As indicated above, spiral antennas according to aspects of the present invention comprise an inner subset of circular turns a-c. It will be appreciated that any manufactured circle will deviate from the mathematical definition of Equation 1. It will also be appreciated that, in the case of circular spirals, some deviation from a circular shape will be present due to the increasing radius as a cumulative radial position. As described above, the shape of the turns of an antenna specified by equations 8 and 9 is continuously changed from a circular shape (for the inner turns) to progressively, more squarish shape as a function of cumulative rotational position. As a result, the turns begin as substantially circular and become non-circular. However, as shown in FIGS. 3A and 3B, an inner subset of turns in spiral antennas according to aspects of the present invention maintain a high degree of circularity and are readily recognized as circular with the naked eye.

As indicated above, in some embodiments, the spiral may be defined by Equation 9 and the change from substantially circular inner turns to squarish turns is gradual. In some embodiments, n is within 10% of 2 (i.e., 1.9≤n≤2.1), and A has a value of 0.99 to 1 (or 0.95 to 1) for at least two circular turns. In some embodiments, n is within 10% of 2 (i.e., 1.9≤n≤2.1), and A has a value of 0.99 to 1 (or 0.95 to 1) for at least five circular turns. In some embodiments, n is within 10% of 2 (i.e., 1.9≤n≤2.1), and A has a value of 0.99 to 1 (or 0.95 to 1) for at least ten circular turns.

In some embodiments, the inner turns may be fully described by an Archimedean shape (n=2), and the change to non-circular shape may be introduced at one or more selected, cumulative rotational positions or by progressively varying n. In such embodiments, n remains equal to 2 for the inner turns. In some embodiments, for the inner turns, A has a value less of 0.99 to 1 (or 0.95 to 1) for at least five turns. In some embodiments, for the inner turns, A has a value of 0.99 to 1 (or 0.95 to 1) for at least ten turns.

As indicated above, spiral antennas according to aspects of the present invention comprise an outer subset of turns having a shape with only four lines of symmetry. The subset having four lines of symmetry may be described in any suitable manner, for example, with polar terms with n greater than 2.25, with Cartesian terms with n greater than 2.25 or any other suitable manner.

It will be appreciated that no manufactured squarish circle will be perfectly symmetrical about 4 lines ($S_1$ and $S_2$ shown in FIG. 2) or be perfectly described by Equation 4 or 5 due at least to manufacturing imprecision. It will also be appreciated that, in the case of spirals, some deviation from a squarish circular shape will be present due to the increasing radius as a function of cumulative radial position (see Equation 9) (i.e., some deviation from perfect symmetry about the lines will be present due to the spiral shape of the antenna). Additionally, in some embodiments, as described above, the shape of the turns is continuously changed to become progressively, more squarish as a function of cumulative rotational position. However, as shown in FIGS. 3A and 3B an outer subset of turns in spiral antennas according to aspects of the present invention have symmetry about only 4 lines and are readily recognized as squarish circles. As would be understood by one of ordinary skill in the art from the present disclosure, the turns are particularly symmetric in regions exclusive of 10 degrees from the starting end and 10 degrees from finishing end of a selected 360-degree portion (i.e., an identified turn); or in regions exclusive of 20 degrees from the starting end and 20 degrees from the finishing end of a selected 360-degree portion.

As indicated above, in some embodiments, the spiral may be described by Equation 9. For example, referring to Equation 9 in some embodiments, the squarish shape occurs where n≥2.5 and A has a value equal to or greater than 0.9 and exists for at least two turns. In some embodiments, the squarish shape occurs where n≥2.5, and A has a value equal to or greater than 0.9 and exists for at least five turns. In some embodiments, the squarish shape occurs where n≥2.5, and A has a value equal to or greater than 0.9 and exists for at least ten turns. In some such embodiments, for the squarish, outer turns 0.95≥A≥0.9.

In some embodiments, it is advantageous that the outer subset not be too square (i.e., deviate to far from the round). That is, in embodiments where the turns are described by Equations 7, it is desirable that the exponent n not exceed 4. It will be appreciated that exceeding a value of four may lead to many of the negative characteristics of a square spiral antenna as set forth above (e.g., as shown in FIG. 1).

As indicated above, one or more transition turns may exist between the inner subset of circular turns and the outer subset of turns having a shape with only four lines of symmetry. The transition turns may provide a continuous change over several turns and be expressible using mathematical equations such as may be achieved using Equations 8 and 9 above. Alternatively, the shape of the turns in the transition region may be determined empirically and without a closed mathematical form in any suitable manner such that inner and outer regions are joined and form an electrically continuous trace that includes the inner turns, transition turns and outer turns.

The trace width may be constant along the entire length of an arm of an antenna; however, in some embodiments, it is desirable that the trace width vary as a function of cumulative rotational position, and in some embodiments, the trace width may vary continuously along the length of an arm and may be monotonically increasing as a function of cumulative radial position.

An antenna trace may be formed of copper or any other suitable conductive material. For example, antennas according to aspects of the present antenna may be formed beginning with a conductor-covered, dielectric printed circuit board, such as a copper-covered, laminate board RO3035 available from Rodgers Corporation of Chandler, Ariz. The antenna trace can be shaped by etching away copper from the board to form a spiral antenna as described above.

As shown in FIG. 8, n some embodiments, it is advantageous to have a copper border 610 formed around the antenna. In embodiments where, prior to etching, the substrate is completely covered with conductive material prior to the etching, it has been found that it is advantageous to leave the copper in place (i.e., not etched away) except where etching is needed to form the trace of an antenna arm. In embodiments having a border, a small gap is present between the copper border and the outermost turn of the antenna 600 to keep the antenna and the border electrically separated. For example, the gap may be a few millimeters (e.g., about 2.0 mm); although, the gap will depend on the selected antenna design and the desired frequency performance. In particular, it was found that the presence of such a border improves low frequency performance of the antenna over antenna designs where the copper is removed from the border region. On the back of the substrate the copper in the border region is left in place and the copper behind the antenna is removed. Accordingly, the border on the back of the substrate and on the front of the substrate form a capacitive region. Typically, the border completely surrounds the antenna to form a capacitive boarder extending radially from the gap. In some embodiments, the border extends at least 1-10 mm radially from the gap at all locations around an antenna, although the radial extent R of the border will depend on the selected antenna design and the desired frequency performance. In some embodiments, the border extends at least 2 mm radially from the gap, at all locations around the arms. In some embodiments, the border extends at least 5 mm radially from the gap, at all locations around the arms. In some embodiments, the border extends at least 10 mm radially from the gap, at all locations around the arms. The border may be electrically connected to an antenna frame (e.g., a frame as described below) which may be in contact with the ground or the border may be left floating.

For example, an antenna according to aspects of the present antenna may be used for communications or direction finding or any other known or yet to developed use.

To facilitate design, for some embodiments, selected variables were introduced into Equations 8-9 so that the equations take the following forms:

$$A(\phi) = \frac{2T}{\pi} M \qquad \text{Equation 13}$$

where multiplier, M, has a form $\phi^x$ the value of variable x may be varied to permit variation in the spacing between the turns of an arm as a function of cumulative radial position, and where T, the width of the trace at a particular cumulative rotational positions, has a form $\phi^y$ and the value of variable y may be varied to permit variation of the trace width as a function of cumulative radial position.

Also, in Equation 9 above, exponent n takes the form $\phi^z$ where variable z permits the shape of the turns to vary as function of cumulative rotational position.

Example #1

In this example of an antenna according to the above described invention, the trace is made of copper. The antenna is formed by etching a substrate of Rodger's RO03035 board having copper on both sides.

As indicated above, it is often advantageous that antennas input impedance is uniform across the entire frequency band over which the antenna is to operate, and the reactive part of the impedance is maintained at or near zero. To that end, the variables x, y and z as set forth above were varied and the uniformity of the impedance was calculated for various values of x, y and z to achieve a uniform impedance across the frequency band. For example, impedance and other characteristics of an antenna design can be calculated using conventional antenna design software such as WIPL-D produced by WIPL-D Co. of Belgrade, Serbia, HFSS available from ANSYS, Inc of Canonsburg, Pa., and FEKO available from Altair, Corp of Troy, Mich.

Figure 4A:
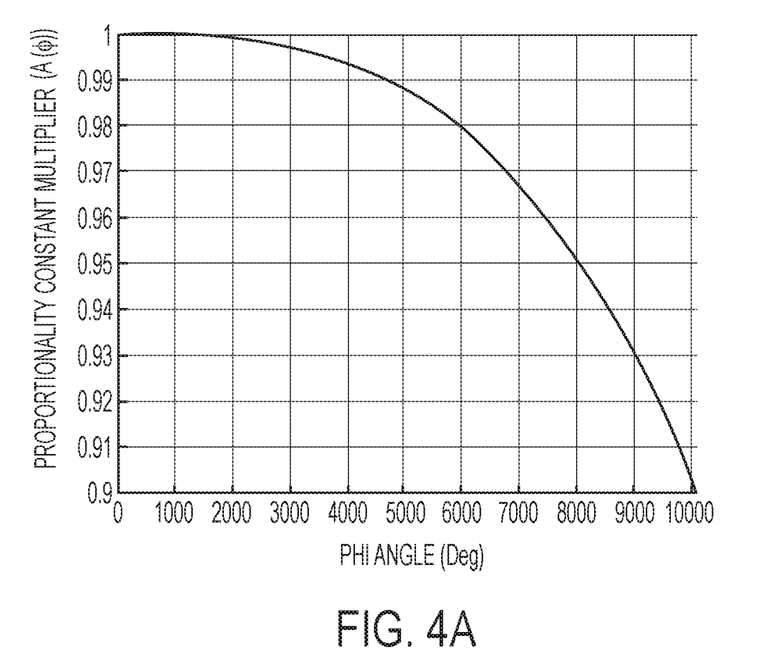
FIG. 4A is a graphical representation of a proportionality constant multiplier M of an arm of an antenna as a function of cumulative rotational position for one example of a spiral antenna according to an embodiment.

The variable M in proportionality constant $A(\phi)$ was selected such that x was equal to 3 and M was scaled to have a value in a range between 0.9 and 1 over the entire cumulative rotational position (i.e., over the length of the arm)(as shown in FIG. 4A).

Figure 4B:
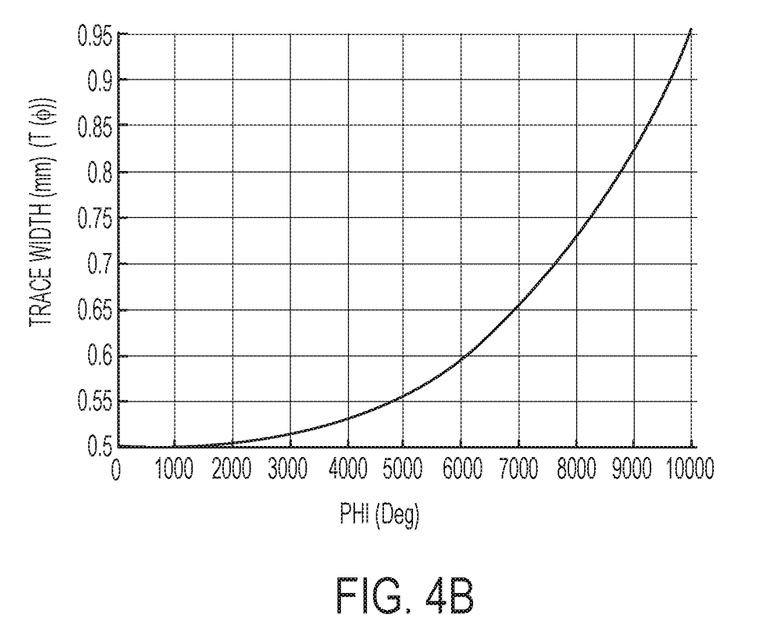
FIG. 4B is a graphical representation of trace width T of an arm of an antenna as a function of cumulative rotational position for one example of an spiral antenna according to aspects of the present invention.

The trace width T of the trace as defined with reference to Equation 11 was selected such that y=2 (shown in FIG. 4B) and the trace width was scaled such that T has a range between 0.5 and 0.95 millimeters the length of the arm.

Figure 4C:
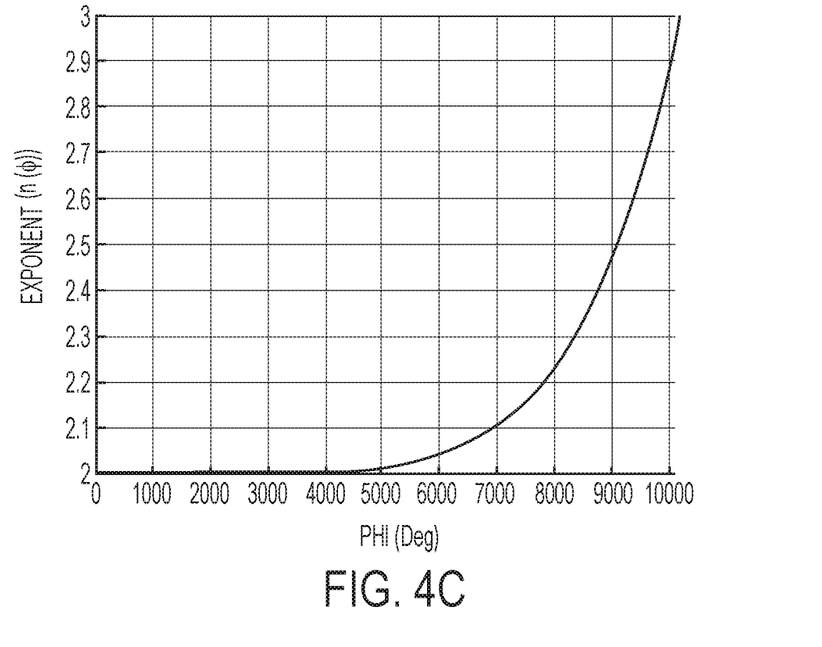
FIG. 4C is a graphical representation of exponent n of an arm of an antenna as a function of cumulative rotational position for one example of an spiral antenna according to an embodiment.

The variation in the shape of the turns as a function of cumulative rotational position was defined by Equation 9 where z=6 (shown in FIG. 4C) and the value of n was scaled such that n ranges between 2 and 3 over length of the arm.

In the present example, the antenna trace covers about 10,000 degrees of cumulative rotational angle (e.g., approximately 30 turns).

Figure 5:
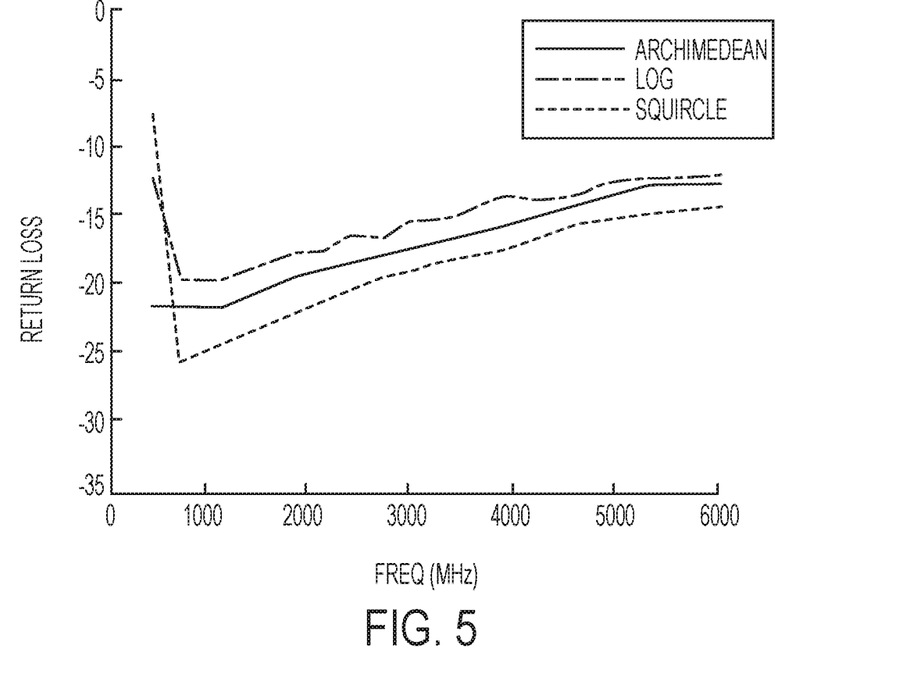
FIG. 5 is a graphical representation of calculated percentage of return loss of a signal input into the antenna, as a function of frequency for the antenna of Example 1.
Figure 6:
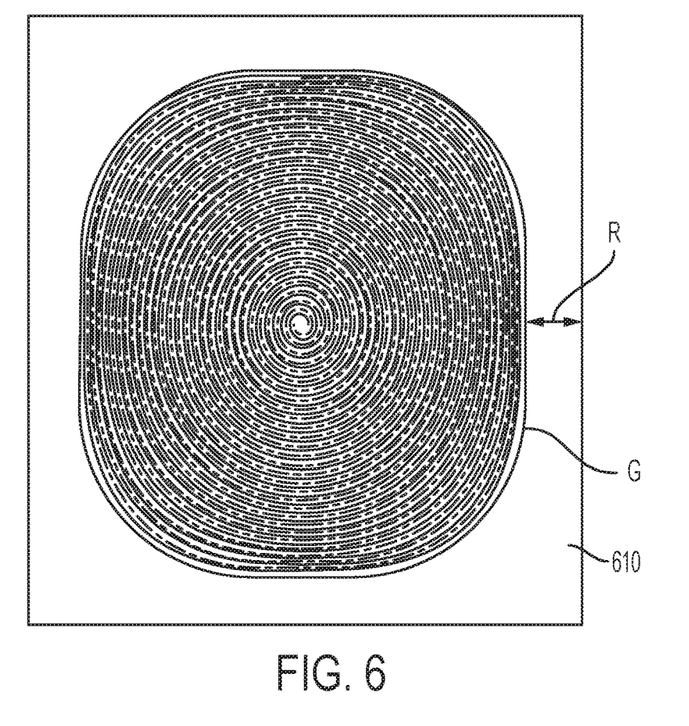
FIG. 6 is an illustration of the antenna of Example 1 according to an embodiment.
Figure 7:
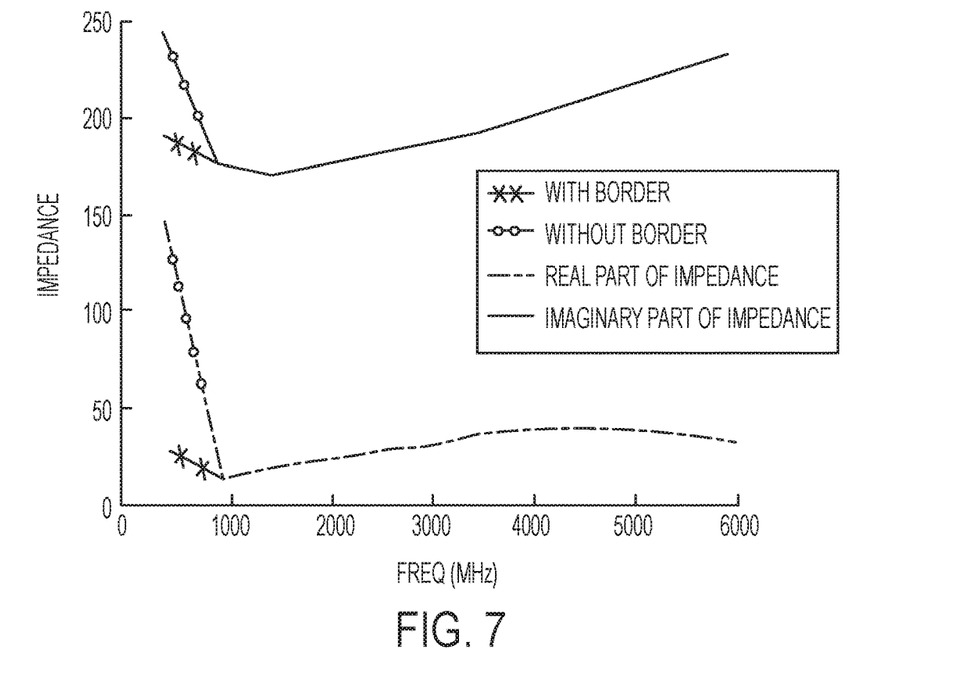
FIG. 7 is a graphical representation of calculated impedance as a function of frequency for the antenna of Example 1.

The resultant structure is show in FIG. 6 (with the unetched copper left in place to form a border as described above with a gap of 1.95 mm between the outer turn and the unetched boarder). The calculated percentage loss of the signal input into the antenna, as a function of frequency for the antenna of Example 1 is shown in FIG. 5 and the impedance as a function of frequency is shown in FIG. 7 (the real part of the impedance is shown with solid lines; and the imaginary part of the impedance is shown with dashed lines). FIG. 7 shows the impedance with a copper border and without a copper boarder present. The improved uniformity of the impedance at low frequencies when a border is present is apparent in FIG. 7.

The antennas having conventional antenna shapes that were used to calculate the information in FIG. 5 were sized for a common low frequency operation of 400 MHz and were constructed as follows:
Archimedean
Trace Width: 1 mm
Number of Turns: 34
Inner Radius: 5 mm
Proportionality Constant: (2×Trace Width/pi)=0.00063662
Equiangular
Trace Width: 1 mm
Number of Turns: 9.5
Inner Radius: 3 mm
Growth Rate: 0.064
Square Spiral
Trace Width: 1 mm
Height to Width Ratio: 1
Number of Turns: 8
Gap between traces: 5.25 mm According to another aspect of the invention, multiple antennas as described above are formed as an array. The array of spiral antennas comprises a substrate on which the antennas are disposed. In some applications, the array is designed to radiate and/or receive radiation in greater than 180-degree azimuthal directions and each antenna in the array is conformally formed on the substrate. Such antenna arrays may be used, for example, for communications or direction finding applications.

FIG. 8A illustrates an example of an embodiment of an antenna array 800 according to aspects of the present invention in which the antenna array is disposed on a substrate 810 that extends in a direction of a longitudinal axis LA. The substrate has a closed cross sectional shape or a substantially closed cross sectional shape. For example, the substrate may have a round cross section in a plane transverse to the longitudinal axis LA. For example, the substrate may have a cylindrical shape or, as described below may have a frusto-conical shape.

A plurality of spiral antennas 100a-100d is disposed on the substrate at different circumferential locations. For example, four spiral antennas may be disposed on the substrate at different circumferential locations around the substrate (e.g., the centers are disposed at 90-degree increments). It will be appreciated that a four-antenna array where each antenna radiates and/or receives radiation over 90-degrees of azimuth would provide coverage for full 360-degree coverage.

In some embodiments, it is advantageous if the substrate is flexible (e.g., Rodgers Board RO3035 having a thickness of 60 mils) to permit flexing during assembly. It will be appreciated that conformal mounting on a flexed substrate allows for greater azimuthal beam width than a flat spiral antenna.

In the illustrated embodiment, each spiral antenna 100a-100d may be constructed as described above for a single spiral antenna, comprising an arm having plurality of turns, the arm comprises an inner subset of circular turns and an outer subset of turns having a shape with only four lines of symmetry.

As indicated above, a spiral antenna radiates a beam normal to each side of the spiral; and for a conformal antenna, radiation is emitted perpendicular to the surface at each location on the antenna trace. Typically for a conformal array of antennas, radiation from only one face of the antenna is desired, this is especially true in the case of a direction finding system. Therefore, one side of the spiral is usually backed by a radiation-absorbing material.

Figure 8B:
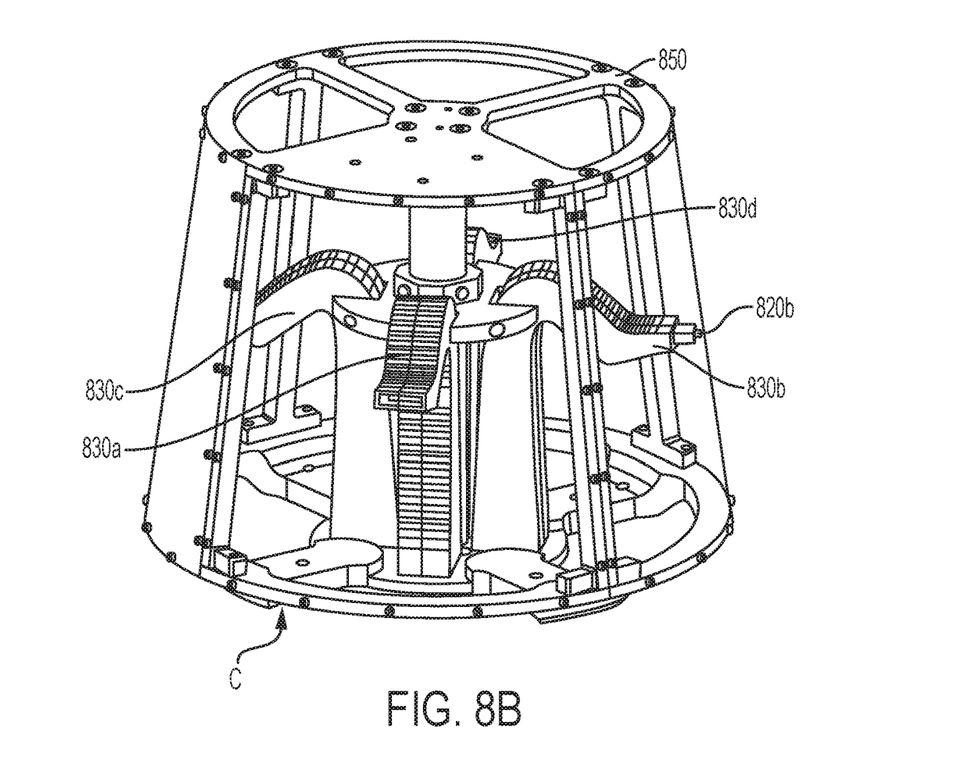
FIG. 8B is a partial cut-away, projection view of an example of an antenna array according to an embodiment.

As shown in FIG. 8B, one of feeds 820a-820d can be coupled to a corresponding one of antennas 100a-100d as shown, at or near an end of the feed. For example, in the illustrated embodiment, the feeds extend within a cavity C formed by the substrate and extends through substrate 810. Each feed has a first conductor 910a (shown in FIG. 9A) soldered to the first arm at the inner end, and a second conductor 910b (shown in FIG. 9B) soldered to the second trace at the inner end.

A feed may have a conventional taper to permit impedance matching at a transmission line (not shown) (e.g., 50 ohms for a conventional coaxial cable) at the bottom of the cavity and impedance matching at the inner winding (e.g., 185 ohms). The feed line may have any suitable, conventional taper such as a Chebyshev, binomial, exponential, triangular and Klopfenstein taper. For example, the length of the feed may be selected to achieve a desirable low-frequency performance.

Figures 9A, 9B:
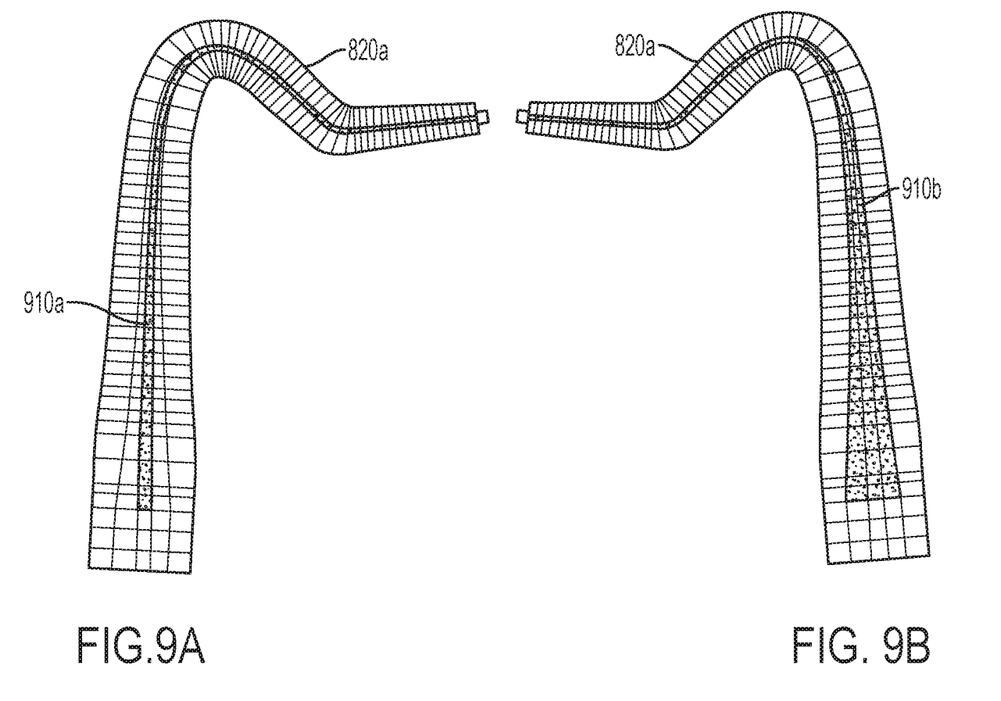
FIG. 9A is the first side of an example of feed board for use with an antenna array according to an embodiment.
FIG. 9B is the second side of an example of feed board for use with an antenna array according to an embodiment.

In the example embodiment of a feed shown in FIGS. 8A and 8B, each of the tapered copper feed lines is formed on one of two sides of a substrate as are shown in FIGS. 9A and 9B. In the illustrated embodiment, first feed line 910a and the second feed line 910b are tapered so that the feed operates as a balun. In some embodiments, the first arm and the second arm are driven with the same signal input, with the signals being 180-degrees out of phase with one another. The shapes of the feed lines to attain such a configuration can be calculated manually or using simulation software as described herein.

The absorbing material (not shown) in the substrate cavity C can be formed by disposing any suitable conventional absorber material in the cavity behind the antennas. For example, a lossy absorbing foam may be used such as AN-77 from Emerson and Cumming Microwave Products of Geel, Belgium. For example, a sheet of AN-77 foam maybe rolled into a cylinder and fit into the cavity. In some embodiments it is desirable that the absorber be spatially separated from the substrate to avoid signal loss, in particular at lower frequencies. For example, the outer surface of the cylinder of foam may be located approximately one inch from the nearest location to the trace of the spiral antenna (e.g., proximate the top of the cone of the substrate).

Example #2

According to this example, an array of four antennas is formed on frustum-shaped substrate. The wall of the cylinder has an 8-degree angle relative to longitudinal axis LA. The bottom of the frustum has a circumference of 40 inches, and the top of the frustum has a circumference of 32.1 inches. The centers of the antennas are disposed at a midpoint between the top and the bottom where the circumference is about 36.1 inches, with the center points of the four antennas equally spaced apart around the circumference. Each antenna in the array has a diameter of about 9.0 inches to allow for mechanical components (e.g., mounting features) for connecting a substrate to an aluminum frame 850. A rolled sheet of absorbing foam has a cylindrical shape is present in the cavity of the frustum with the longitudinal axis of the cylinder aligned with longitudinal axis LA, with the absorber being no closer than 1 inch from the spiral at its closet point. To avoid the absorber contacting the feedboard, a feedboard cover 830a-830d is provided around each feed board. The cover may be made of any suitable electrically insulative material such as a plastic. As shown in FIGS. 8A and 8B, the conical shape of the cylinder tilts the antenna upward from the horizon assuming longitudinal axis LA is perpendicular to the earth surface. For example, the array may operate over a bandwidth of 350 MHz-8 GHz or 400 MHz-6 GHz. It will be appreciated that the spiral antennas allow for detection of signals from dipole antennas in any orientation.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A spiral antenna, comprising:
a first arm and a second arm, the first arm and second arm being interlaced with each other, each arm having a plurality of turns, the plurality of turns comprising:
an inner subset of circular turns,
an outer subset of turns, electrically coupled to the inner subset, having a shape with only four lines of symmetry; and
wherein the first arm and the second arm are defined by the equations:

$$x = r(\phi)|\cos\phi|^{\frac{2}{n(\phi)}}\text{sgn}(\cos\phi); \text{ and}$$

$$y = r(\phi)|\sin\phi|^{\frac{2}{n(\phi)}}\text{sgn}(\sin\phi).$$

2. The antenna of claim 1, wherein the first arm and second arm are identical with the first arm rotated 180-degrees relative to the second arm.

3. The antenna of claim 1, wherein the antenna has a first curved face.

4. The antenna of claim 1, wherein the antenna is formed on a substrate.

5. The antenna of claim 1, wherein the first arm continuously changes from the circular shape of the inner turns to the shape having only four lines of symmetry.

6. The antenna of claim 1, wherein the inner subset of turns has values of n in the range $1.9 \leq n \leq 2.1$ and a value of a proportionality constant A in the range 0.95 to 1.

7. The antenna of claim 1, wherein the inner subset of turns has values of a proportionality constant A in the range 0.99 to 1.

8. The antenna of claim 1, wherein in the inner subset of turns has values of n equal to 2.

9. The antenna of claim 1, wherein the outer subset of turns has values of n where $4 \geq n \geq 2.5$.

10. The antenna of claim 1, wherein the outer subset of turns has values of a proportionality constant A in the range $0.95 \geq A \geq 0.9$.

11. The antenna of claim 1, wherein at least one of first arm and the second has a trace width that varies as a function of cumulative radial position.

12. The antenna of claim 1, where the antenna comprises a conductive border surrounding the outermost turn of the first arm and the second arm.

13. The antenna of claim 12, further comprising a gap between: (i) the outermost turn of the first arm and (ii) the second arm and the border, such that the first arm and the second arm are electrically separated from the border.

14. The antenna of claim 12, wherein the border extends radially at least 1 mm from the gap at all circumferential locations around the first arm and the second arm.

15. An array of spiral antennas, comprising;
a substrate extending in a direction of a longitudinal axis and having a round cross section in a plan transverse to the longitudinal axis;
four spiral antennas disposed on the substrate at different circumferential locations around the substrate, each spiral antenna comprising a first arm and a second arm, the first arm and the second arm being interlaced with each other,
each arm having a plurality of turns, the plurality of turns comprising:
an inner, subset of circular turns, and
an outer subset of turns having a shape with only four lines of symmetry, wherein the first arm and the second arm of each antenna are defined by the equations:

$$x = r(\phi)|\cos\phi|^{\frac{2}{n(\phi)}}\operatorname{sgn}(\cos\phi); \text{ and}$$

$$y = r(\phi)|\sin\phi|^{\frac{2}{n(\phi)}}\operatorname{sgn}(\sin\phi).$$

16. The array of spiral antennas of claim 15, wherein the antenna array comprises a conductive border surrounding the outermost turn of the first arm and the second arm of each antenna.

17. The array of spiral antennas of claim 16, further comprising a gap between the outermost turn of the first arm and the second arm of each antenna and the border, such that the first arm and the second arm of each antenna is electrically separated from the border.

18. The array of spiral antennas of claim 16, wherein the border extends at least 5 mm from each of the gaps at all circumferential locations around the first arm and the second arm of each antenna.

\* \* \* \* \*